United States Patent
Jang et al.

(10) Patent No.: US 10,691,242 B2
(45) Date of Patent: Jun. 23, 2020

(54) TOUCH DISPLAY DEVICE

(71) Applicant: LG DISPLAY CO., LTD., Seoul (KR)

(72) Inventors: Hoon Jang, Goyang-si (KR);
Soon-Dong Cho, Gumi-si (KR);
Won-Yong Jang, Bucheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/135,596

(22) Filed: Sep. 19, 2018

(65) Prior Publication Data
US 2019/0121476 A1 Apr. 25, 2019

(30) Foreign Application Priority Data
Oct. 24, 2017 (KR) .................. 10-2017-0138131

(51) Int. Cl.
| G06F 3/041 | (2006.01) |
|---|---|
| G06F 3/044 | (2006.01) |
| G09G 3/20 | (2006.01) |
| G06F 3/047 | (2006.01) |

(52) U.S. Cl.
CPC ............ G06F 3/0412 (2013.01); G06F 3/044 (2013.01); G06F 3/047 (2013.01); G06F 3/0416 (2013.01); G06F 3/0418 (2013.01); G06F 3/0446 (2019.05); G06F 3/04166 (2019.05); G09G 3/20 (2013.01); G09G 2310/08 (2013.01); G09G 2330/021 (2013.01)

(58) Field of Classification Search
CPC . G06F 3/0416; G06F 3/044; G09G 2330/021; G09G 2330/00
See application file for complete search history.

(56) References Cited

U.S. PATENT DOCUMENTS
2018/0052432 A1* 2/2018 Kim ..................... G05B 15/02
* cited by examiner Primary Examiner — Dennis P Joseph
(74) Attorney, Agent, or Firm — Birch, Stewart, Kolasch & Birch, LLP (57) ABSTRACT

A touch display device can include a panel including touch electrodes; a touch/data driver to drive data lines and the touch electrodes of the panel, read out capacitance variations in the touch electrodes and output sensing data; a gate driver to drive gate lines of the panel; a timing controller to control display operations of the touch/data driver and the gate driver; a microcontroller unit (MCU) to control touch driving and sensing operations of the touch/data driver; a first power circuit to drive the timing controller and the gate driver using a main voltage supplied through a first power line; a multiplexer to output one of a universal serial bus (USB) voltage supplied through a second power line and the main voltage supplied through the first power line; a second power circuit configured to drive the touch/data driver, the gate driver and the MCU based on an output voltage from an output of the multiplexer; and a switch connected between the output of the multiplexer and the second power line, the switch being configured to switch the output of the multiplexer to the second power line.

18 Claims, 7 Drawing Sheets

TOUCH DISPLAY DEVICE

CROSS-REFERENCE TO RELATED APPLICATIONS

This application claims the priority benefit of Korean Patent Application No. 10-2017-0138131, filed in the Republic of Korea on Oct. 24, 2017, which is hereby incorporated by reference as if fully set forth herein.

BACKGROUND

Technical Field

The present disclosure relates to a touch display device capable of performing normal touch driving and sensing operations irrespective of a main power and auxiliary power supply sequence and preventing display defects.

Description of the Related Art

A touch sensor capable of inputting information through touch applied to a display screen is applied to various displays, such as notebook computers, monitors and home appliances as well as portable information devices such as smartphones.

Touch techniques for displays include an add-on type, in which a touch panel is attached to a display panel, and an in-cell type, in which touch electrodes are embedded in a display panel. The in-cell type is evolving into an advanced in-cell touch (AIT) type, in which a common electrode of a liquid crystal display is divided into different areas and used as touch electrodes.

An AIT display device drives a touch display panel by time-dividing each frame period into at least one data writing period, in which image data is written to pixels, and at least one touch driving period, in which a touch driving signal is applied to touch electrodes and whether touch is occurred is sensed.

The AIT display device uses a load free driving (LFD) method of applying signals having the same phase as the touch driving signal to data lines and gate lines in order to reduce load of touch electrodes when the touch driving signal is applied to the touch electrodes in the touch driving period. That is, a touch/data driver including a touch circuit provides a common voltage LFD signal supplied from a touch power circuit to the data lines and the touch electrodes and a gate driver provides a gate low LFD signal VGL_LFD supplied from the touch power circuit to the gate lines in the touch driving period.

In addition, electronic apparatuses, such as notebook computers, turn off main power and maintain a universal serial bus (USB) power supply state in a sleep mode, in order to reduce power consumption. An AIT display device applied to such notebook computers uses main power for normal operation. The AIT display device drives circuits for touch operation by using USB power instead of the main power in a sleep mode and turns off circuits that are unnecessary for touch operation by cutting off the main power, thereby reducing power consumption.

However, when USB power is off and then is supplied again under a sleep mode condition in which main power is off and only USB power is used in a set test procedure, a module setup procedure and the like, a malfunction may occur. Furthermore, when the USB power is supplied first before the main power is provided according to a power sequence of a set, a malfunction may also occur.

For example, when the USB power is off and then is supplied again under a sleep mode condition in which the main power is off and only the USB power is supplied, the touch/data driver cannot perform an initialization process because a timing controller using the main power is turned off, and thus output switches of the data driver cannot perform normal operation even if output of the touch power circuit is supplied thereto.

Accordingly, a normal common voltage LFD signal is not output due to abnormal operation of the touch/data driver in the sleep mode, and thus malfunction may occur in touch driving and sensing operations. Furthermore, a ground voltage is supplied to the data lines whereas a specific voltage higher than the ground voltage is applied to the touch electrodes due to abnormal operation of the touch/data driver, and thus a DC voltage may be applied to liquid crystal. In this instance, a turn-on state of liquid crystal continues due to accumulation of the DC voltage with the lapse of time, resulting in the occurrence of display defects such as screen whitening.

SUMMARY

In various embodiments, the present disclosure provides a touch display device capable of preventing display defects, and performing normal touch driving and sensing operations irrespective of a main power and auxiliary power supply sequence.

A touch display device according to an embodiment includes: a panel including a plurality of touch electrodes divided and arranged in a pixel array; a touch/data driver for driving data lines and the touch electrodes of the panel, reading out capacitance variations in the touch electrodes and outputting sensing data; a gate driver for driving gate lines of the panel; a timing controller for controlling display operations of the touch/data driver and the gate driver; and a microcontroller unit (MCU) for controlling touch driving and sensing operations of the touch/data driver. In addition, the touch display device includes: a first power circuit for driving the timing controller and the gate driver using a main voltage supplied through a first power line; a multiplexer for outputting one of a USB voltage supplied through a second power line and the main voltage supplied through the first power line; a second power circuit for driving the touch/data driver, the gate driver and the MCU using the output voltage of the multiplexer; and a switch connected between the output of the multiplexer and the second power line and switching the output of the multiplexer to the second power line.

The multiplexer can select and output the main voltage when both the main voltage and the USB voltage are input and can select and output the USB voltage when the main voltage is not supplied and only the USB voltage is input.

The MCU can monitor the main voltage supplied through the first power line and, when the main voltage is not supplied, turn on the switch for a set time to supply the output voltage of the multiplexer to the first power circuit.

When the USB voltage is supplied first before supply of the main voltage or the USB voltage is off and then supplied again in a sleep mode condition in which the main voltage is off and only the USB voltage is supplied, the first power circuit can receive the output voltage of the multiplexer through the switch for the set time to drive the timing controller, the touch/data driver can perform an initialization process under the control of the timing controller, and the first power circuit can be turned off until the main voltage is supplied when the switch is turned off after the set time.

The first power circuit can include: a plurality of buck circuits for generating and providing driving voltages of the timing controller using the voltage of the first power line; and a power management integrated circuit for generating a gate off voltage and a common voltage using the power of the first power line, providing the gate off voltage and the common voltage to the second power circuit, generating a plurality of gate control signals using timing signals supplied from the timing controller and providing the gate control signals to the gate driver.

The second power circuit can include: a booster circuit for generating and providing an analog circuit driving voltage of the touch/data driver using the output voltage of the multiplexer; a plurality of buck circuits for generating and providing digital circuit driving voltages of the MCU and the touch/data driver using the output voltage of the multiplexer; and a touch power integrated circuit.

The touch power integrated circuit can be provided with the analog circuit driving voltage from the booster circuit, the gate off voltage and the common voltage from the power management integrated circuit, and control signals from the MCU. The touch power integrated circuit can provide the common voltage to the touch/data driver and provide the gate low voltage to the gate driver in a data writing period. The touch power integrated circuit can generate a touch driving signal, provide the touch driving signal to the touch/data driver, generate a gate off modulation signal having the same phase and the same amplitude of those of the touch driving signal, and provide the gate off modulation signal to the gate driver in a touch driving period, according to control of the MCU.

The touch/data driver can provide a data signal to the data lines and provide the common voltage to the touch electrodes through routing lines in the data writing period, and provide the touch driving signal to the routing lines in the touch driving period. The gate driver can provide a scan signal and the gate off voltage to corresponding gate lines in the data writing period, and provide the gate off modulation signal to the gate lines in the touch driving period.

DETAILED DESCRIPTION

Hereinafter, embodiments of the present disclosure will be described with reference to the attached drawings.

Figure 1:
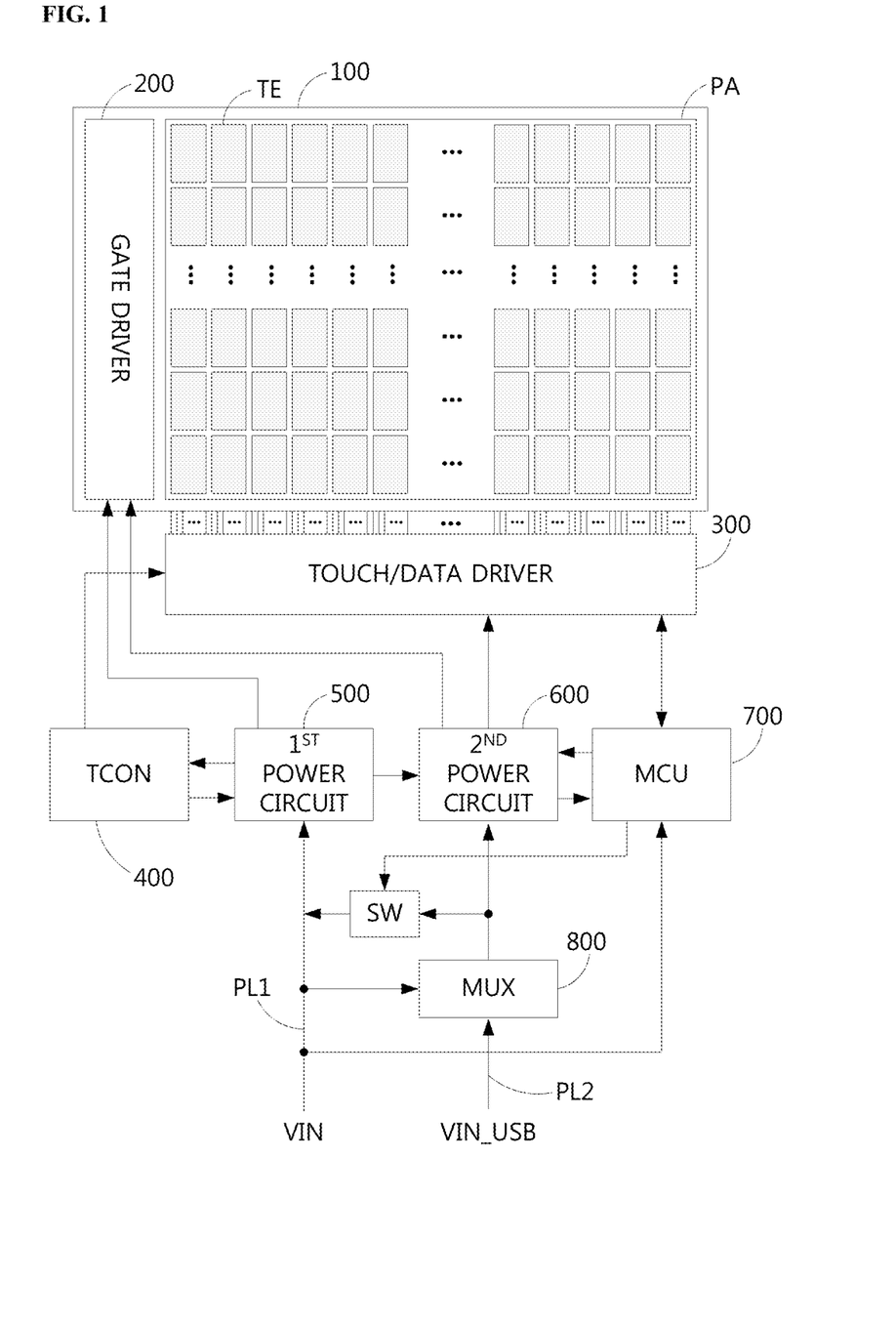
FIG. 1 is a block diagram schematically illustrating a configuration of a touch display device according to an embodiment of the present disclosure.
Figure 2:
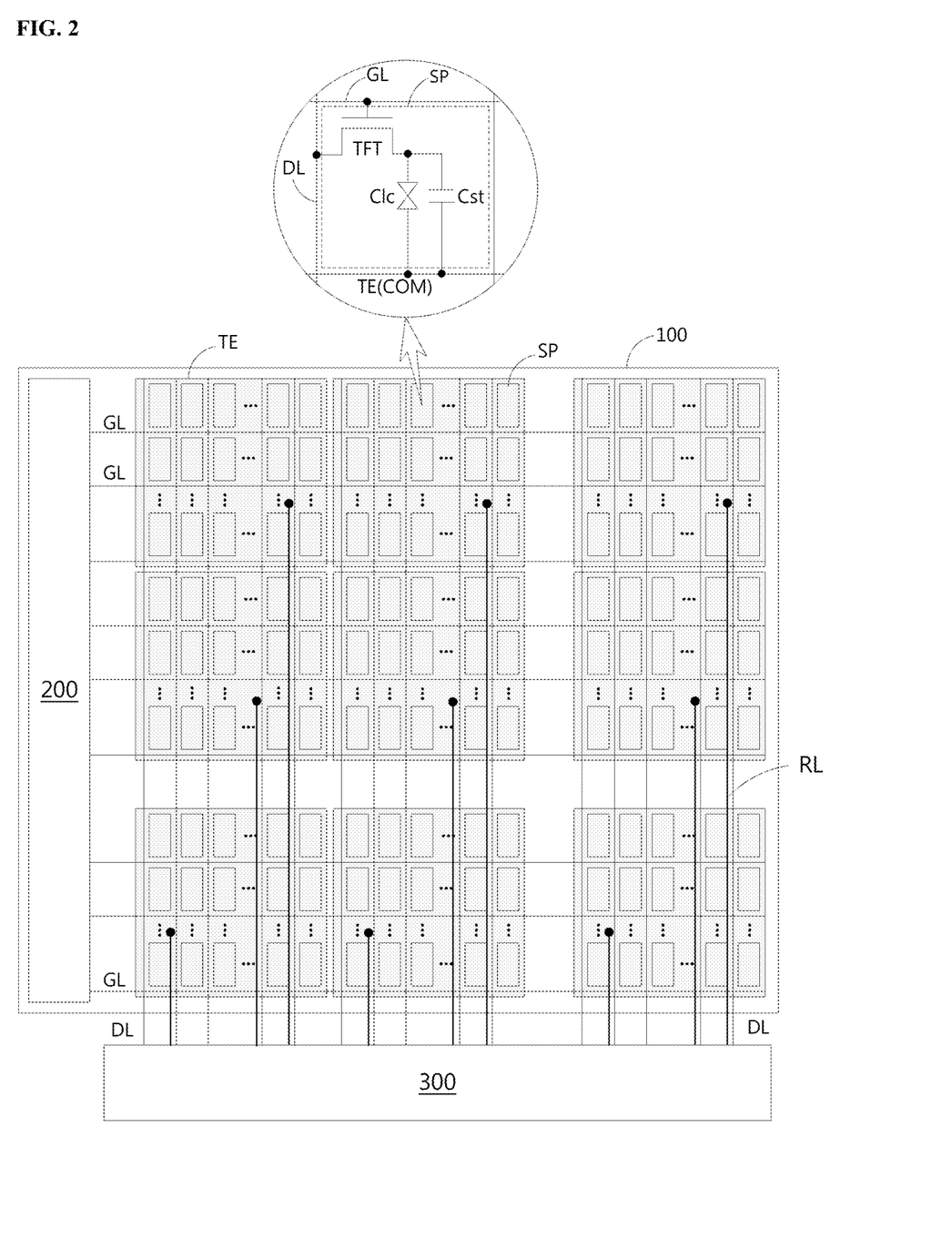
FIG. 2 is a diagram illustrating configurations of touch electrodes and sub-pixels in the touch display panel according to an embodiment of the present disclosure.
Figure 3:
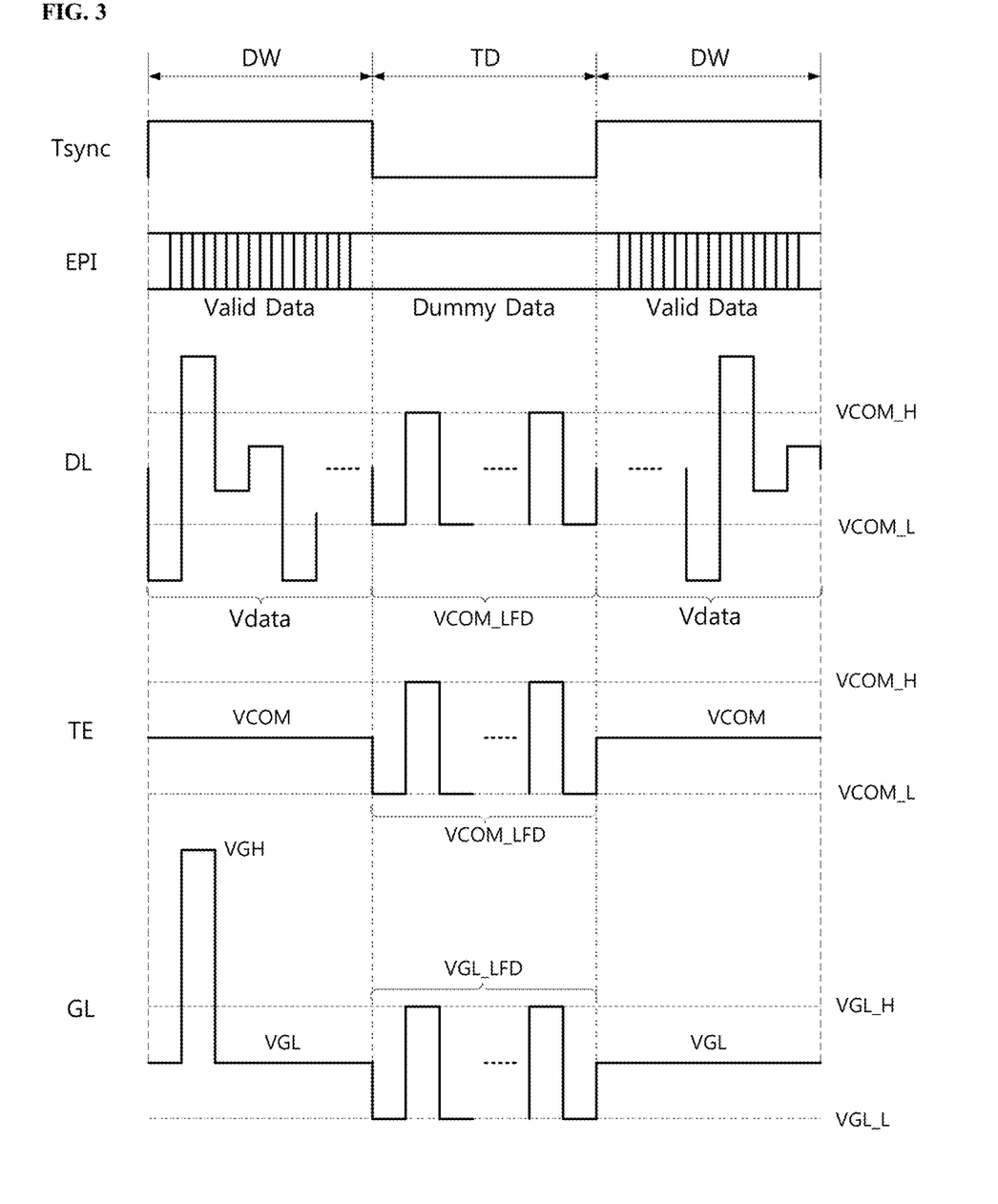
FIG. 3 is a driving waveform diagram with respect to certain periods of the touch display device according to an embodiment of the present disclosure.
Figure 4:
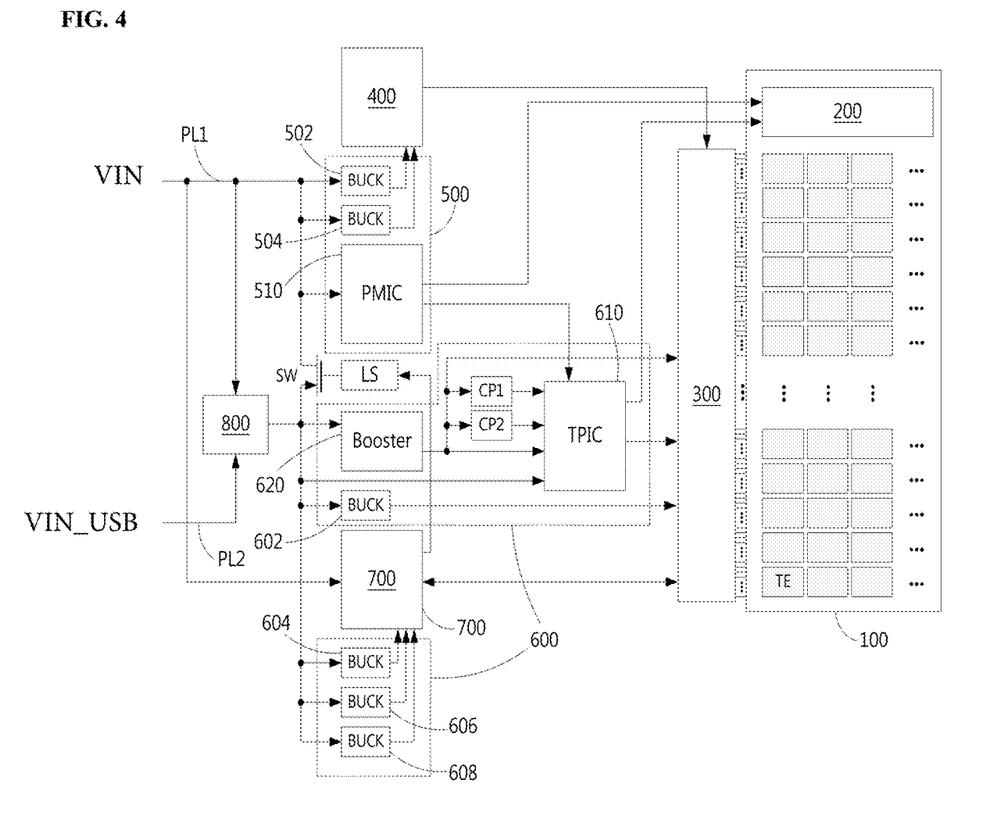
FIG. 4 is a block diagram illustrating the configuration of the touch display device according to an embodiment of the present disclosure, which focuses on power circuits.

FIG. 1 is a block diagram schematically illustrating a configuration of a touch display device according to an embodiment of the present disclosure. FIG. 2 is a diagram illustrating configurations of touch electrodes and sub-pixels in the touch display panel according to an embodiment. FIG. 3 is a driving waveform diagram with respect to certain periods of the touch display device according to an embodiment. FIG. 4 is a block diagram illustrating the configuration of the touch display device according to an embodiment, which focuses on power circuits.

Referring to FIG. 1, the touch display device includes a panel 100, a gate driver 200, a touch/data driver 300, a timing controller (TCON) 400, a first power circuit 500, a second power circuit 600, and a microcontroller unit (MCU) 700.

The panel 100 has touch and display functions, displays an image through a pixel array PA in which sub-pixels are arranged in a matrix, and senses touch through a capacitive touch sensing method using touch electrodes TE used as a common electrode. One of a mutual capacitance touch sensing method and a self-capacitance touch sensing method can be used as the capacitive touch sensing method. In embodiments of the present invention, the self-capacitance touch sensing method is exemplified.

The panel 100 displays an image through the pixel array in which the sub-pixels SP are arranged in a matrix, as illustrated in FIG. 2. A base pixel can be composed of at least three sub-pixels among white (W), red (R), green (G) and blue (B) sub-pixels, which can express white by mixing colors. For example, the base pixel or unit pixel can be composed of R/G/B sub-pixels, W/R/G sub-pixels, B/W/R sub-pixels, G/B/W sub-pixels or W/R/G/B sub-pixels.

Each sub-pixel SP includes a thin film transistor TFT connected to a gate line GL and a data line DL, a liquid crystal capacitor Clc connected to the thin film transistor TFT and a touch electrode TE which is also used as a common electrode COM, and a storage capacitor Cst. The liquid crystal capacitor Clc charges a difference voltage between a data signal supplied to a pixel electrode through the thin film transistor TFT and a common voltage supplied to the touch electrode TE, and drives liquid crystal according to the charged voltage to control light transmissivity. The storage capacitor Cst stably maintains the voltage charged in the liquid crystal capacitor Clc.

The panel 100 includes a plurality of touch electrode groups included in the pixel array PA. As illustrated in FIG. 2, each touch electrode group includes a plurality of touch electrodes TE arranged in the direction of data lines DL, and a plurality of routing lines RL for individually connecting the plurality of touch electrodes TE to a touch/data driver 300. The plurality of touch electrodes TE is formed by dividing up a common electrode positioned in the pixel array, and each touch electrode TE is formed in a predetermined size including a plurality of sub-pixels SP, in consideration of a touch point size.

The TCON 400 is provided with image data and timing signals from a system. The timing signals include a dot clock signal, a data enable signal, a vertical synchronization signal and a horizontal synchronization signal.

The TCON 400 generates data control signals for controlling operation timing of the touch/data driver 300 using the timing signals supplied from the system and timing information stored in an internal register and provides the data control signals to the touch/data driver 300. For example, the data control signals include a source start pulse signal and a source sampling clock signal used to control data latch timing, a source output enable signal for controlling data output timing, a polarity control signal for controlling the polarity of a data signal, and the like.

The TCON 400 generates simple timing signals, such as an on-clock signal, an off-clock signal and a start signal, used to generate gate control signals in a level shifter included in the first power circuit 500 using timing signals supplied from the host system and the timing information stored in the internal register, and the TCON 400 provides the simple timing signals to the first power circuit 500.

The TCON 400 is provided with a touch synchronization signal Tsync from the MCU 700. The TCON 400 can generate the touch synchronization signal Tsync and provide the touch synchronization signal Tsync to the MCU 700 and the second power circuit 600.

The touch synchronization signal Tsync represents at least one data writing period DW and at least one touch driving period TD realized by time-dividing each frame period. The data writing period DW refers to a period in which image data is written to each sub-pixel by charging the image data in each sub-pixel while scanning the sub-pixels of the panel 100. The touch driving period refers to a period in which a touch driving signal VCOM_LFD is applied to the touch electrodes TE of the panel 100 and whether touch is occurred is sensed.

The TCON 400 performs various image processes for picture quality compensation and power consumption reduction on image data received from the system and stores the image data in a memory. The TCON 400 reads the image data from the memory at a higher reading rate than a writing rate in the data writing period DW and provides display information including the image data and data control signals to the touch/data driver 300.

The TCON 400 and the touch/data driver 300 transmit and receive data using one of various interfaces. For example, the TCON 400 uses an embedded point-to-point interface (EPI), which converts various types of control information and image data into a serial form including a clock signal and transmits the same in units of a packet in a point-to-point manner.

The TCON 400 converts the display information including the control information and the image data into an EPI packet including a clock signal and transmits the EPI packet to the touch/data driver 300 through a transmission line pair. The EPI packet includes a clock training pattern for internal clock locking of the touch/data driver 300, an align training pattern, a control packet including a clock signal and data control information in a serial form, a data packet including a clock signal and image (pixel) data in a serial form, and the like.

When power is supplied to the TCON 400 and the touch/data driver 300, the touch/data driver 300 performs an EPI initialization process for locking an internal clock signal using the clock training pattern supplied from the TCON 400. Then, the touch/data driver 300 restores display information such as the clock signal, control information and image data from the EPI packet supplied from the TCON 400 in the data writing period DW, converts the image data into an analog data signal Vdata using a plurality of gamma voltages, and provides the analog data signal Vdata to the data lines DL of the panel 100. The touch/data driver 300 supplies a common voltage VCOM provided from the second power circuit 600 in the data writing period DW to the touch electrodes TE through the routing lines RL such that the touch electrodes TE serve as a common electrode.

The touch/data driver 300 simultaneously provides the touch driving signal VCOM_LFD provided from the second power circuit 600 to the routing lines RL and the data lines DL of the panel 100 in the touch driving period TD.

The touch/data driver 300 includes a read-out circuit, supplies the touch driving signal VCOM_LFD to the touch electrodes TE through the routing lines RL in the touch driving period TD, and then reads out a signal fed back from each touch electrode TE through an individual routing line RL. The touch/data driver 300 differentially amplifies the touch driving signal VCOM_LFD and the read-out signal with respect to each touch electrode TE to sense self-capacitance variation (a signal delay amount) in each touch electrode TE due to touch, and generates sensing data (touch sensing information) through signal processing and provides the sensing data to the MCU 700.

The touch/data driver 300 can be composed of a plurality of touch/data ICs, and each touch/data IC can be mounted on a circuit film such as a chip on film (COF) and bonded to the panel 100 through tape-automated bonding (TAB) or mounted on the panel 100 in the manner of a chip on glass (COG).

The gate driver 200 receives a plurality of gate control signals and driving voltages from the first power circuit 500 and receives a gate off signal including a gate off voltage VGL and a gate off modulation signal VGL_LFD from the second power circuit 600.

The gate driver 200 generates scan pulses according to the gate control signals to individually drive the gate lines GL in the data writing period DW. The gate driver 200 supplies scan pulses of a gate on voltage VGH to each gate line GL in each driving period of each gate line GL, and supplies the gate off voltage VGL to each gate line GL in a non-driving period of each gate line GL during the data writing period DW.

The gate driver 200 supplies the gate off modulation signal VGL_LFD to the gate lines GL in the touch driving period TD.

The gate driver 200 can be embedded as a gate-in-panel (GIP) type in a non-active area of the panel 100 by being formed on a substrate along with a thin film transistor array, which constitutes the pixel array PA of the panel 100. The GIP type gate driver 200 can be disposed on one side or both sides of the panel 100.

The gate driver 200 can be composed of a plurality of gate ICs, and each gate IC can be mounted on a circuit film such as a COF and bonded to the panel 100 through TAB or mounted on the panel 100 in the manner of a COG.

The MCU 700 can generate the touch synchronization signal Tsync and provide the touch synchronization signal Tsync to the TCON 400 and the second power circuit 600. The MCU 700 can generate various timing control signals used for touch driving and sensing operations, and the MCU 700 can provide the timing control signals to the touch/data driver 300 and the second power circuit 600. The MCU 700 receives touch sensing information from the touch/data driver 300, signal-processes the touch sensing information to determine whether touch has been applied, detects a touch point, generates coordinates of the touch point and provides the coordinates to the system.

The first power circuit 500 receives a main voltage VIN corresponding to a first input voltage from the system through a first power line PL1 connected to a user connector, generates a plurality of driving voltages and provides the driving voltages. The first power circuit 500 can generate and provide a plurality of driving voltages for the TCON 400, the gate driver 200, the memory and the like using the main voltage VIN. The first power circuit 500 can generate the gate off voltage VGL and the common voltage VCOM and provide the same to the second power circuit 600.

In addition, the first power circuit 500 can include a level shifter, receive simple timing signals including an on-clock signal, an off-clock signal, a start signal and the like from the TCON 400, and the first power circuit 500 can generate a plurality of gate control signals and provide the gate control signals to the gate driver 200. For example, the first power circuit 500 generates a plurality of clock signals having different rising timings synchronized with the on-clock signal supplied from the TCON 400 and different falling timings synchronized with the off-clock signal supplied from the TCON 400, outputs the clock signals to the gate driver 200, level-shifts the start signal, a reset signal and the like supplied from the TCON 400 and outputs the level-shifted signals to the gate driver 200.

A multiplexer (MUX) 800 receives the main voltage VIN supplied through the first power line PL1, receives a USB voltage VIN_USB corresponding to a second input voltage from the system through a second power line PL2 connected to a USB connector, and outputs one of the received input voltages to the second power circuit 600. The MUX 800 outputs the main voltage VIN higher than the USB voltage VIN_USB to the second power circuit 600 when the main voltage VIN and the USB voltage VIN_USB are simultaneously supplied in a system operation mode, and the MUX 800 outputs the USB voltage VIN_USB to the second power circuit 600 in a system sleep mode in which the main voltage VIN is not supplied.

The second power circuit 600 receives the output voltage of the MUX 800, generates a plurality of driving voltages for driving circuits related to touch driving and sensing operations, such as the gate driver 200, the touch/data driver 300 and the MCU 700, and the second power circuit 600 outputs the driving voltages.

The second power circuit 600 can generate digital circuit driving voltages supplied to the touch/data driver 300 and the MCU 700, an analog circuit driving voltage AVDD supplied to the touch/data driver 300, the touch driving signal VCOM_LFD, the gate off modulation signal VGL_LFD supplied to the gate driver 200, and the like using the output of the MUX 800, output the generated signals. The second power circuit 600 can output the common voltage VCOM received from the first power circuit 500 to the touch/data driver 300, and output the gate off voltage VGL received from the first power circuit 500 to the gate driver 200.

The system supplies both the main voltage VIN and the USB voltage VIN_USB in the operation mode, and the system blocks supply of the main voltage VIN and maintains supply of the USB voltage VIN_USB in the sleep mode.

Accordingly, when in the operation mode, in which both the main voltage VIN and the USB voltage VIN_USB are supplied from the system, the first power circuit 500 generates and outputs the plurality of driving voltages using the main voltage VIN supplied through the first power line PL1, and the second power circuit 600 generates and outputs the plurality of driving voltages using the main voltage VIN supplied through the first power line PL1 and the MUX 800. Therefore, the touch display device can alternately execute a display function and a touch sensing function in the operation mode.

Further, when in the sleep mode, in which only the USB voltage VIN_USB is supplied from the system, the first power circuit 500 connected to the first power line PL1 is turned off and the second power circuit 600 generates and outputs the plurality of driving voltages for the touch driving and sensing operations using the USB voltage VIN_USB supplied through the second power line PL2 and the MUX 800. Accordingly, the touch display device can execute only the touch sensing function in the sleep mode of the system.

Particularly, the MCU 700 can monitor the main voltage VIN supplied through the first power line PL1. When the main voltage VIN is not supplied, the MCU 700 can turn on a switch SW connected between the MUX 800 and the first power line PL1 for a set time (e.g., switch SW can be turned on for a predetermined period of time), such that the output voltage of the MUX 800 can be applied to the first power line PL1.

Accordingly, the first power circuit 500 can be provided with the USB voltage VIN_USB output from the MUX 800 through the switch SW and operate the TCON 400 for a set time using the USB voltage VIN_USB. Therefore, when the USB voltage VIN_USB is supplied before the main voltage VIN is supplied or the USB voltage VIN_USB is off and then supplied again in a sleep mode condition in which only the USB voltage VIN_USB is supplied, the TCON 400 operates by the first power circuit 500 using the USB voltage VIN_USB during a turn-on time of the switch SW to provide the clock training pattern to the touch/data driver 300, and thus the touch/data driver 300 can perform the EPI initialization process and normally operate.

Referring to FIG. 4, the first power circuit 500 can include a power management integrated circuit (PMIC) 510 connected to the first power line PL1 and a plurality of buck circuits 502 and 504. The plurality of buck circuits 502 and 504 decrease a voltage supplied thereto through the first power line PL1 to a down level, generate a plurality of digital circuit driving voltages to operate the TCON 400 and provide the digital circuit driving voltages. The PMIC 510 generates a plurality of driving voltages using a voltage supplied thereto through the first power line PL1, provides the driving voltages to the memory and the gate driver 200, generates the gate off voltage VGL and the common voltage VCOM, provides the gate off voltage VGL and the common voltage VCOM to the second power circuit 600, generates gate control signals using simple timing signals supplied from the TCON 400 and provides the gate control signals to the gate driver 200.

Referring to FIG. 4, the second power circuit 600 can include a touch power integrated circuit (TPIC) 610, a booster circuit 620, a plurality of buck circuits 602, 604, 606 and 608, and a plurality of charge pump circuits CP1 and CP2. The buck circuits 602, 604, 606 and 608 decrease the output voltage of the MUX 800 to a down level, generate a plurality of digital circuit driving voltages to operate the touch/data driver 300 and the MCU 700, and output the digital circuit driving voltages. The booster circuit 620 boosts the output voltage of the MUX 800 to an up level, generates an analog circuit driving voltage AVDD for the TPIC 610, the touch/data driver 300 and the charge pump circuits CP1 and CP2, and provides the analog circuit driving voltage AVDD. The charge pump circuits CP1 and CP2 charge-pump the output voltage of the booster circuit 620 to generate the gate on voltage VGH and a second gate off voltage VGL2, and provide the gate on voltage VGH and the second gate off voltage VGL2 to the TPIC 610.

The TPIC 610 receives the touch synchronization signal Tsync and the timing control signals from the MCU 700, receives the gate off voltage VGL and the common voltage VCOM from the PMIC 510 and receives the analog circuit driving voltage AVDD from the booster circuit 620. The TPIC 610 provides the common voltage VCOM to the touch/data driver 300 and provides the gate off voltage VGL to the gate driver 200 in response to the touch synchronization signal Tsync and the timing control signals in the data writing period DW. The TPIC 610 generates the touch driving signal VCOM_LFD, provides the touch driving signal VCOM_LFD to the touch/data driver 300, generates the gate off modulation signal VGL_LFD having the same phase and the same amplitude as those of the touch driving signal VCOM_LFD, and provides the gate off modulation signal VGL_LFD to the gate driver 200 in response to the touch synchronization signal Tsync and the timing control signals in the touch driving period TD.

The MCU 700 monitors the main voltage VIN supplied from the first power line PL1. When the main voltage VIN is not supplied, the MCU 700 supplies a control signal to the switch SW to turn on the switch SW for a set time (e.g., a predetermined time period) such that the output voltage of the MUX 800 can be supplied to the first power line PL1. One of an NMOS transistor and a PMOS transistor can be applied as the switch SW. For example, a PMOS FET can be applied. In addition, a level shifter LS for shifting the logic level of the control signal of the MCU 700 to a voltage capable of turning on the switch SW can be additionally provided between the MCU 700 and the switch SW.

When the USB voltage VIN_USB is supplied prior to supply of the main voltage VIN or the USB voltage VIN_USB is off and then supplied again in a sleep mode condition in which only the USB voltage VIN_USB is supplied, the switch SW supplies the USB voltage VIN_USB output from the MUX 800 to the first power line PL1 for the set time (e.g., a predetermined amount of time) in response to control of the MCU 700. Accordingly, the first power circuit 500, including the buck circuits 502 and 504 and the PMIC 510, operates the TCON 400 for the set time using the USB voltage VIN_USB supplied to the first power line PL1 such that the touch/data driver 300 can perform the EPI initialization process and normally operate under the control of the TCON 400.

Accordingly, the touch/data driver 300 can be initialized according to control of the TCON 400 using the USB voltage VIN_USB even when the USB voltage VIN_USB is supplied prior to supply of the main voltage VIN, and thus it is possible to prevent malfunction in operation of the touch/data driver 300 and display defects, such as screen whitening due to power sequence reversal.

In addition, when the switch SW is turned off according to control of the MCU 700, supply of power to the first power line PL1 is blocked and thus the operations of the first power circuit 500 and the TCON 400 are stopped, reducing power consumption in the sleep mode.

Referring to FIG. 3, the touch/data driver 300 converts image data transmitted from the TCON 400 into an analog data signal Vdata, supplies the analog data signal Vdata to the data lines DL of the panel 100, and provides the common voltage VCOM supplied from the TPIC 610 to the touch electrodes TE through the routing lines RL in response to data control signals supplied from the TCON 400 in the data writing period DW. The gate driver 200 sequentially drives corresponding gate lines GL according to gate control signals supplied from the PMIC 510 in the data writing period DW.

Referring to FIG. 3, the touch/data driver 300 simultaneously provides the touch driving signal VCOM_LFD supplied from the TPIC 610 to the data line DL and the routing lines RL and the gate driver 200 provides the gate off modulation signal VGL_LFD supplied from the TPIC 610 to the gate lines GL in the touch driving period TD. The touch/data driver 300 reads out capacitance variations in the touch electrodes TE through the routing lines RL and outputs sensing data representing whether touch has been applied to the MCU 700 in the touch driving period TD.

In the touch driving period TD, the touch driving signal VCOM_LFD is supplied in a pulse form in which a common high voltage VCOM H and a common low voltage VCOM_L periodically alternate, and the gate off modulation signal VGL_LFD is supplied in a pulse form in which a gate off high voltage VGH H and a gate off low voltage VGL_L alternate in synchronization with the touch driving signal VCOM_LFD.

The TPIC 610 can receive the common voltage VCOM and the gate off voltage VGL from the PMIC 510 and use the common high voltage VCOM H, the common low voltage VCOM_L, the gate off high voltage VGL_H, and the gate off low voltage VGL_L by converting digital data stored in an internal memory into analog voltages. The common high voltage VCOM H, which is used as the touch driving signal VCOM_LFD, can be higher than the common voltage VCOM and the common low voltage VCOM_L can be lower than the common voltage VCOM. Alternatively, the common low voltage VCOM_L can be the same as the common voltage VCOM. The gate off high voltage VGL_H used as the gate off modulation signal VGL_LFD can be lower than the gate high voltage VGH and higher than the gate off voltage VGL, and the gate off low voltage VGL_L can be lower than the gate off voltage VGL. Alternatively, the gate off low voltage VGL_L can be the same as the gate off voltage VGL. The swing widths of the common high voltage VCOM H and the common low voltage VCOM_L are identical to the swing widths of the gate off high voltage VGL_H and the gate off low voltage VGL_L.

In the touch driving period TD, the touch driving signal VCOM_LFD supplied to the data lines DL and the touch electrodes TE of the panel 100 and the gate off modulation signal VGL_LFD supplied to the gate lines GL have the same phase and the same amplitude, and thus the touch electrodes TE can operate load-free. That is, initial capacitances between the touch electrodes TE and the gate lines GL and between the touch electrodes TE and the data lines DL in the panel 100 can be minimized according to load-free operation during the touch driving period TD to minimize a resistor capacitor (RC) load of the touch electrodes TE, thereby minimizing signal distortion due to the RC load and improving touch sensitivity.

The touch driving signal VCOM_LFD and the gate off modulation signal VGL_LFD can have various waveforms, such as trapezoid waves and sine waves, in addition to the square waves shown in FIG. 3.

Figure 5:
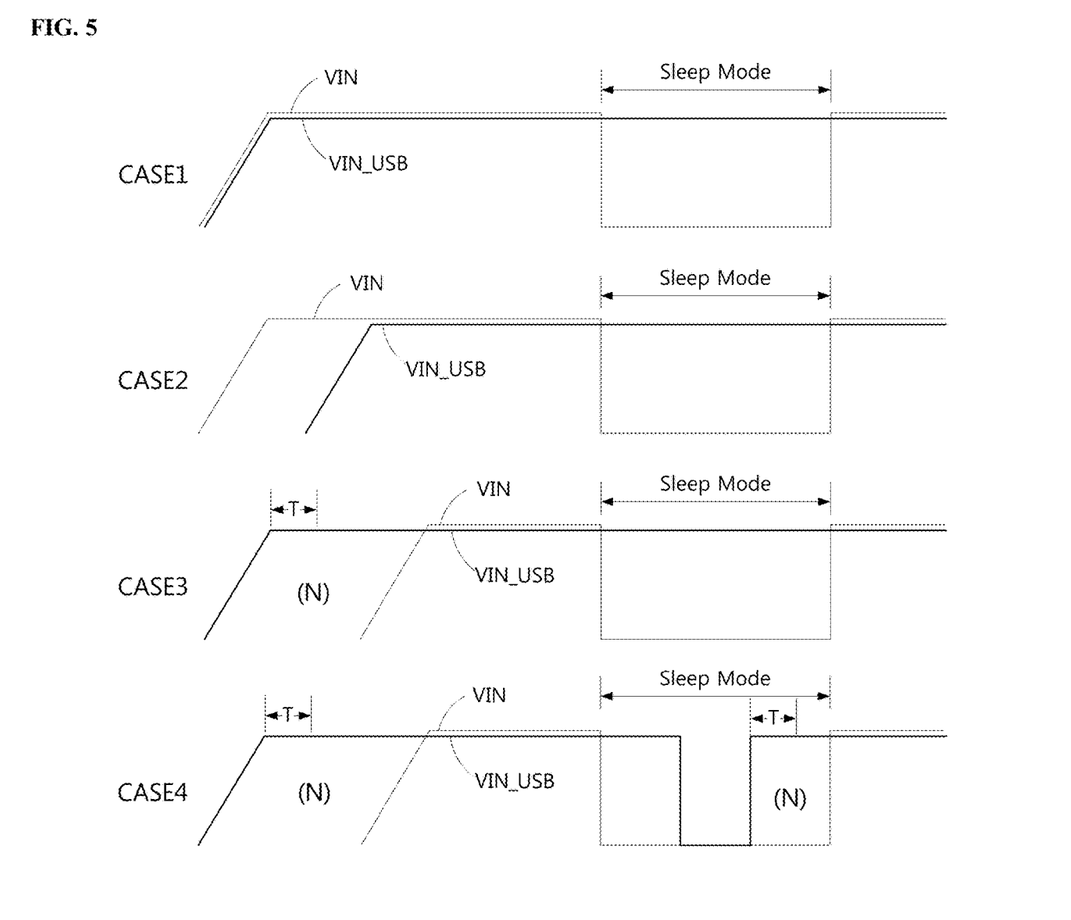
FIG. 5 is a timing diagram illustrating various main power and USB power supply sequences in the touch display device according to an embodiment of the present disclosure.

FIG. 5 is a timing diagram illustrating various main power and USB power supply sequences in the touch display device according to an embodiment of the present invention.

Referring to FIG. 5, when the system is turned on, the main voltage VIN can be supplied to the touch display device first and then the USB voltage VIN_USB can be supplied thereto, and then the main voltage VIN can be turned off and only the USB voltage VIN_USB is supplied to the touch display device in the sleep mode, as in case 1 and case 2.

Referring to FIG. 5, the USB voltage VIN_USB can be supplied first from the system to the touch display device and then the main voltage VIN can be supplied thereto, as in case 3 and case 4, or the USB voltage VIN_USB can be off and then supplied again to the touch display device in the sleep mode in which the main voltage VIN is off, as shown in case 4.

When the supply order of the main voltage VIN and USB voltage VIN_USB is reversed, as shown in case 3 and case 4, the touch/data driver cannot perform the initialization process because the TCON using the main voltage VIN is turned off in a period N from when the USB voltage VIN_USB is supplied first to when the main voltage VIN is supplied in the related art, and thus an abnormal touch driving signal may be supplied to the panel, causing a malfunction.

Further, in the touch display device according to an embodiment, the USB voltage VIN_USB is supplied to the first power line PL1 through the switch SW for a set time T (e.g., a predetermined time period T) to drive the TCON 400 to initialize the touch/data driver 300 when supply of the main voltage VIN to the first power line PL1 is cut off, and thus the output switches of the touch/data driver 300 can continue to normally operate without interruption to output the normal touch driving signal VCOM_LFD to the data lines DL and the touch electrodes TE, as described above with reference to FIGS. 1 and 4.

Accordingly, the touch display device according to an embodiment can perform normal touch driving and sensing operations irrespective of the sequence of supply of the main voltage VIN and the USB voltage VIN_USB and prevent display defects such as screen whitening due to power sequence reversal. For example, no matter how the order of the main voltage VIN and the USB voltage VIN_USB are turned on and off, normal touch driving and sensing operations can still be performed.

Figure 6A:
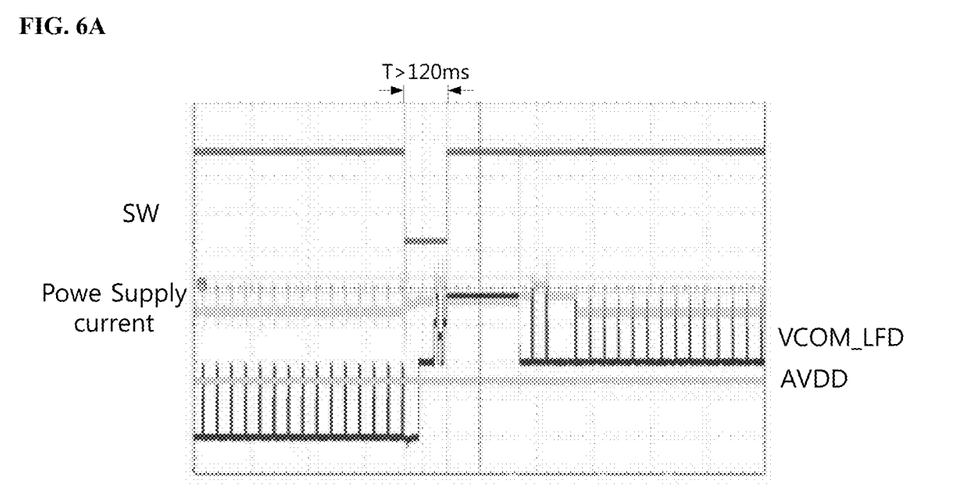
FIGS. 6A, 6B and 6C are waveforms diagram showing simulation results of a touch driving waveform according to switch turn-on setting time in the touch display device according to an embodiment of the present disclosure.
Figure 6B:
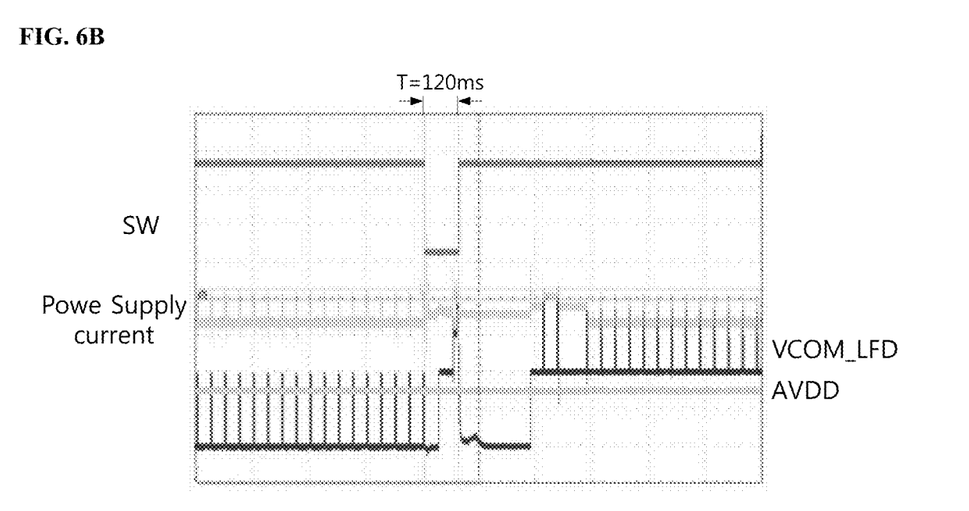
Figure 6C:
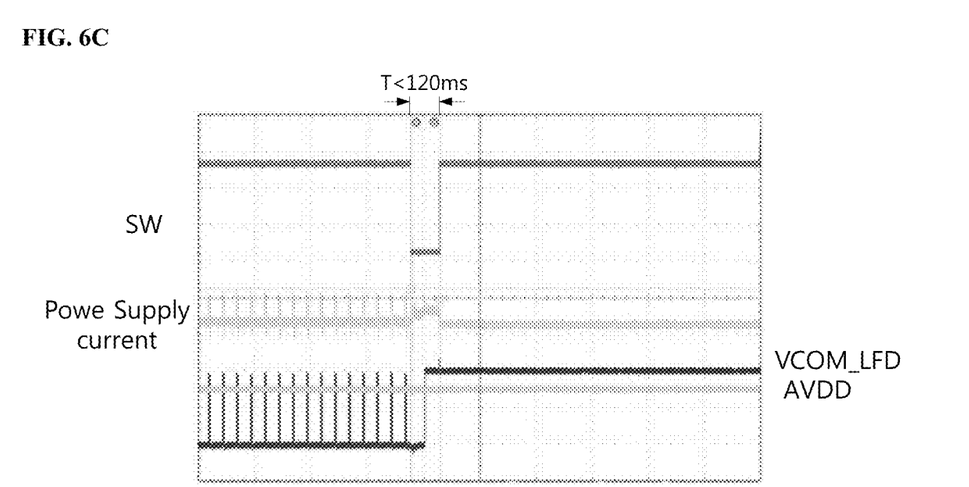

FIGS. 6A, 6B, and 6C are diagrams illustrating simulation results of a touch driving waveform according to a switch turn-on setting time in the touch display device according to an embodiment of the present invention.

FIGS. 6A, 6B, and 6C show the touch driving signal VCOM_LFD output from the touch/data driver according to turn-on time T of the switch W when the USB power is off and then supplied again in a sleep mode condition in which the main power is off and only the USB power is used.

The touch/data driver outputs the normal touch driving signal VCOM_LFD when the turn-on time T of the switch SW is 120 ms or longer, as shown in FIGS. 6A and 6B, whereas the touch/data driver outputs the abnormal touch driving signal VCOM_LFD when the turn-on time T of the switch SW is shorter than 120 ms, as shown in FIG. 6C. A minimum turn-on time T of the switch SW may depend on the panel and is not limited to the 120 ms described in FIGS. 6A, 6B, and 6C.

As described above, the touch display device according to an embodiment can drive a power circuit using the USB power instead of the main power for a specific amount of time in the sleep mode to secure enough time for the timing controller to properly initialize the touch/data driver.

Accordingly, the touch display device according to an embodiment can initialize the touch/data driver for a specific time for which the timing controller operates using the USB power even when the USB power is supplied prior to the main power in a sleep mode condition, and thus the output switches can normally operate to output the normal touch driving signal VCOM_LFD to the data lines and the touch electrodes, thereby preventing display defects due to abnormal touch driving signal output.

Consequently, the touch display device according to an embodiment can perform normal touch driving and sensing operations in a sleep mode condition irrespective of the sequence in which the main power and the USB power are supplied, and can prevent occurrence of malfunction due to power sequence reversal.

Those skilled in the art will appreciate that the present disclosure can be performed in other specific ways than those set forth herein without departing from the spirit and characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A touch display device comprising:
a panel including touch electrodes divided and arranged in a pixel array;
a touch/data driver configured to drive data lines and the touch electrodes of the panel, read out capacitance variations in the touch electrodes and output sensing data;
a gate driver configured to drive gate lines of the panel;
a timing controller configured to control display operations of the touch/data driver and the gate driver;
a microcontroller unit (MCU) configured to control touch driving and sensing operations of the touch/data driver;
a first power circuit configured to drive the timing controller and the gate driver using a main voltage supplied through a first power line;
a multiplexer configured to output one of a universal serial bus (USB) voltage supplied through a second power line and the main voltage supplied through the first power line;
a second power circuit configured to drive the touch/data driver, the gate driver and the MCU based on an output voltage from an output of the multiplexer; and
a switch connected between the output of the multiplexer and the first power line, the switch being configured to switch the output of the multiplexer to the first power line,
wherein the first power circuit comprises:
a plurality of buck circuits configured to generate driving voltages for the timing controller based on a voltage of the first power line; and
a power management integrated circuit configured to:
generate a gate off voltage and a common voltage based on a voltage of the first power line, and
supply the gate off voltage and the common voltage to the second power circuit.

2. The touch display device according to claim 1, wherein the multiplexer is further configured to:
select the main voltage and output the main voltage to the output of the multiplexer, when both the main voltage and the USB voltage are input to the first and second power lines, respectively, and
select the USB voltage from the second power line and output the USB voltage to the output of the multiplexer, when the main voltage is not supplied to the first power line while only the USB voltage is input to the second power line.

3. The touch display device according to claim 2, wherein the MCU is further configured to monitor the main voltage supplied through the first power line, and
in response to the main voltage transitioning from a state of being supplied through the first power line to a state of not being supplied to the first power line, turn on the switch for a set amount of time and supply the output voltage of the multiplexer to the first power circuit during the set amount of time.

4. The touch display device according to claim 3, wherein the first power circuit is further configured to:
in response to the USB voltage being supplied to the second power line before the main voltage is supplied to the first power line or in response to the USB voltage not being supplied to the second power line and then the USB voltage being supplied again to the second power line while the main voltage is off and only the USB voltage is supplied at the second power line, in a sleep mode, receive the output voltage of the multiplexer through the switch for the set amount of time to drive the timing controller while the touch/data driver performs an initialization process and the first power circuit is turned off until the main voltage is supplied to the first power circuit when the switch is turned off after the set amount of time.

5. The touch display device according to claim 1, wherein the first power circuit is further configured to:
in response to the USB voltage being supplied to the second power line before the main voltage is supplied to the first power line, receive the output voltage of the multiplexer through the switch for a set amount of time to drive the timing controller while the touch/data driver performs an initialization process and the first power circuit is turned off until the main voltage is supplied to the first power circuit when the switch is turned off after the set amount of time.

6. The touch display device according to claim 1, wherein the power management integrated circuit is further configured to:
generate a plurality of gate control signals based on timing signals supplied from the timing controller and supply the gate control signals to the gate driver.

7. The touch display device according to claim 1, wherein the second power circuit comprises:
a booster circuit configured to generate an analog circuit driving voltage for the touch/data driver based on the output voltage of the multiplexer;
a plurality of buck circuits configured to generate digital circuit driving voltages for the MCU and the touch/data driver based on the output voltage of the multiplexer; and
a touch power integrated circuit configured to:
receive the analog circuit driving voltage from the booster circuit,
receive the gate off voltage and the common voltage from the power management integrated circuit, and
receive control signals from the MCU.

8. The touch display device according to claim 7, wherein the touch power integrated circuit is further configured to:
supply the common voltage to the touch/data driver and supply a gate low voltage to the gate driver in a data writing period,
generate a touch driving signal and supply the touch driving signal to the touch/data driver,
generate a gate off modulation signal having a same phase and a same amplitude as the touch driving signal, and
supply the gate off modulation signal to the gate driver in a touch driving period.

9. The touch display device according to claim 8, wherein the touch/data driver is further configured to:
supply a data signal to the data lines and the common voltage to the touch electrodes through routing lines in the data writing period, and
supply the touch driving signal to the routing lines in the touch driving period, and wherein the gate driver is further configured to:
supply a scan signal and the gate off voltage to corresponding gate lines in the data writing period, and
supply the gate off modulation signal to the gate lines in the touch driving period.

10. The touch display device according to claim 1, wherein the first power circuit is further configured to:
in response to the USB voltage not being supplied to the second power line and then the USB voltage being supplied again to the second power line while the main voltage is off and only the USB voltage is supplied at the second power line, in a sleep mode, receive the output voltage of the multiplexer through the switch for a set amount of time to drive the timing controller while the touch/data driver performs an initialization process and the first power circuit is turned off until the main voltage is supplied to the first power circuit when the switch is turned off after the set amount of time.

11. A touch display device comprising:
a panel including touch electrodes;
a touch/data driver connected to data lines and the touch electrodes of the panel;
a gate driver;
a timing controller;
a microcontroller unit (MCU) connected to the touch/data driver;
a first power circuit connected to the gate driver, the timing controller and a first power line;
a multiplexer connected to a second power line and the first power line;
a second power circuit connected to the touch/data driver, the gate driver, the MCU, and the multiplexer; and
a switch connected between an output of the multiplexer and the first power line,
wherein the first power circuit comprises:
a plurality of buck circuits configured to generate driving voltages for the timing controller based on a voltage of the first power line; and
a power management integrated circuit configured to:
generate a gate off voltage and a common voltage based on a voltage of the first power line, and
supply the gate off voltage and the common voltage to the second power circuit.

12. The touch display device according to claim 11, wherein the multiplexer is configured to:
select a main voltage supplied from the first power line and output the main voltage to the output of the multiplexer, when both the main voltage and a universal serial bus (USB) voltage are input to the first and second power lines, respectively, and
select the USB voltage from the second power line and output the USB voltage to the output of the multiplexer, when the main voltage is not supplied to the first power line while only the USB voltage is input to the second power line.

13. The touch display device according to claim 11, wherein the first power circuit is configured to:
in response to the USB voltage being supplied to the second power line before the main voltage is supplied to the first power line or in response to the USB voltage not being supplied to the second power line and then the USB voltage being supplied again to the second power line while the main voltage is off and only the USB voltage is supplied at the second power line during a sleep mode, receive the output voltage of the multiplexer through the switch for a set amount of time to drive the timing controller while the touch/data driver performs an initialization process.

14. The touch display device according to claim 11, wherein the switch is configured to:
supply the USB voltage to the first power circuit for a set amount of time while the touch/data driver performs an initialization process and while the main voltage is absent from the first power line.

15. The touch display device according to claim 11, wherein the power management integrated circuit is further configured to:
generate a plurality of gate control signals based on timing signals supplied from the timing controller and supply the plurality of gate control signals to the gate driver.

16. The touch display device according to claim 11, wherein the second power circuit comprises:
a booster circuit configured to generate an analog circuit driving voltage for the touch/data driver based on the output voltage of the multiplexer;
a plurality of buck circuits configured to generate digital circuit driving voltages for the MCU and the touch/data driver based on the output voltage of the multiplexer; and
a touch power integrated circuit configured to:
receive the analog circuit driving voltage from the booster circuit,
receive the gate off voltage and the common voltage from the power management integrated circuit, and
receive control signals from the MCU.

17. The touch display device according to claim 16, wherein the touch power integrated circuit is further configured to:
supply the common voltage to the touch/data driver and supply a gate low voltage to the gate driver in a data writing period,
generate a touch driving signal and supply the touch driving signal to the touch/data driver,
generate a gate off modulation signal having a same phase and a same amplitude as the touch driving signal, and
supply the gate off modulation signal to the gate driver in a touch driving period.

18. The touch display device according to claim 17, wherein the touch/data driver is further configured to:
supply a data signal to the data lines and the common voltage to the touch electrodes through routing lines in the data writing period, and
supply the touch driving signal to the routing lines in the touch driving period, and
wherein the gate driver is further configured to:
supply a scan signal and the gate off voltage to corresponding gate lines in the data writing period, and
supply the gate off modulation signal to the gate lines in the touch driving period.

* * * * *